(12) United States Patent
Munro

(10) Patent No.: US 6,978,676 B2
(45) Date of Patent: Dec. 27, 2005

(54) DISTANCE MEASURING SYSTEMS AND METHODS THEREOF

(75) Inventor: James F. Munro, 6502 County Line Rd., Ontario, NY (US) 14519

(73) Assignee: James F. Munro, Ontario, NY (US)

( * ) Notice: Subject to any disclaimer, the term of this patent is extended or adjusted under 35 U.S.C. 154(b) by 171 days.

(21) Appl. No.: 10/666,907

(22) Filed: Sep. 19, 2003

(65) Prior Publication Data

US 2004/0060376 A1   Apr. 1, 2004

Related U.S. Application Data

(60) Provisional application No. 60/414,572, filed on Sep. 27, 2002.

(51) Int. Cl.[7] .............................. G01H 5/00; G01P 3/36
(52) U.S. Cl. .......................................... 73/597; 356/27
(58) Field of Search ........................ 73/597, 627, 632; 702/164; 356/5.01, 27, 498, 28

(56) References Cited

U.S. PATENT DOCUMENTS

| | | | |
|---|---|---|---|
| 4,882,849 A * | 11/1989 | Amir ........................... | 33/567 |
| 4,975,889 A | 12/1990 | Petrucelli et al. | |
| 5,082,276 A * | 1/1992 | Stevens ....................... | 473/223 |
| 5,471,042 A * | 11/1995 | Kirkeby et al. ......... | 235/472.02 |
| 5,767,953 A | 6/1998 | McEwan | |
| 5,933,224 A * | 8/1999 | Hines et al. ............... | 356/4.01 |
| 6,298,010 B1 * | 10/2001 | Ritz et al. ................... | 367/116 |
| 6,560,560 B1 * | 5/2003 | Tachner ...................... | 702/164 |
| 2003/0004729 A1 * | 1/2003 | Allen et al. ................. | 704/275 |
| 2004/0025563 A1 * | 2/2004 | Stierle et al. ................ | 73/1.79 |
| 2004/0114129 A1 * | 6/2004 | Gogolla et al. ............ | 356/4.01 |
| 2004/0135991 A1 * | 7/2004 | Gogolla et al. ............ | 356/5.01 |

* cited by examiner

*Primary Examiner*—Charles Garber
(74) *Attorney, Agent, or Firm*—Nixon Peabody LLP

(57) ABSTRACT

A distance measuring system includes a housing with at least one surface, at least one switch along the one surface of the housing, an energy system in the housing, and a distance computation system coupled to the energy system. The switch has an inactivated position and an activated position when pressed against an origination object. The activated position of the switch identifies the surface as a reference plane with respect to the origination object. The energy system transmits energy towards a target when the switch is in an activated position and receives at least a portion of the energy which is reflected back from the target. The distance computation system uses the received portion of the energy which is reflected back and the identification of the surface as the reference plane to determine a distance from the origination object to the target.

36 Claims, 8 Drawing Sheets

DISTANCE MEASURING SYSTEMS AND METHODS THEREOF

This application claims the benefit of U.S. Provisional Patent Application Ser. No. 60/414,572 filed Sep. 27, 2002 which is herein incorporated by reference in its entirety.

FIELD OF THE INVENTION

The present invention generally relates to distance measuring systems and, more particularly, to portable or hand-held distance measuring systems of the projected energy type.

BACKGROUND OF THE INVENTION

All distance measuring devices measure the distance between two points. One type of hand-held distance measuring device uses the round trip transit time of projected energy to a target and back to the device to determine distance.

Although this type of hand held measuring device works, it has some problems. One of the problems with this type of device is with establishing a reference plane from which the measurements are made. Errors in establishing the correct reference plane result in measurement errors. Another problem is that this type of hand held measuring device requires the user to manually turn the device on, as well as enter other measurement parameters, before being able to perform the distance measurement.

SUMMARY OF THE INVENTION

A distance measuring system in accordance with embodiments of the present invention includes a housing with at least one surface, at least one switch along the one surface of the housing, an energy system in the housing, and a distance computation system coupled to the energy system. The switch has an inactivated position and an activated position when pressed against an origination object. The activated position of the switch identifies the surface as a reference plane with respect to the origination object. The energy system transmits energy towards a target when the switch is in an activated position and receives at least a portion of the energy which is reflected back from the target. The distance computation system uses the received portion of the energy which is reflected back and the identification of the surface as the reference plane to determine a distance from the origination object to the target.

A method for making a distance measuring system in accordance with embodiments of the present invention includes providing a housing with at least one surface. At least one switch is put along the one surface of the housing. The switch has an inactivated position and an activated position when pressed against an origination object. The activated position of the switch identifies the surface as a reference plane with respect to the origination object. The energy system is placed in the housing and transmits energy towards a target when the switch is in an activated position and receives at least a portion of the energy which is reflected back from the target. The distance computation system is coupled to the energy system and uses the received portion of the energy which is reflected back and the identification of the surface as the reference plane to determine a distance from the origination object to the target.

A method for measuring a distance from an origination object to a target in accordance with embodiments of the present invention includes activating a switch in a housing. The activation identifies a surface of the housing as a reference plane with respect to a surface of the origination object. Energy is transmitted towards a target in response to the activation of the switch. At least a portion of the energy which is reflected back from the target is received. The received portion of the energy which is reflected back and the identification of the surface of the housing as the reference plane is used to determine a distance from the origination object to the target.

The present invention provides a projected energy type, distance measuring system that automatically selects the correct reference plane and powers on the unit as part of the distance measuring operation itself. The present invention also saves time and improves productivity because the device can easily be used with one hand and has a high degree of accuracy. The automatic reference plane selection in this device which is activated when the device is activated to take a measurement eliminates the risk of an operator error in manually entering a reference plane selection.

DETAILED DESCRIPTION

Figure 1:
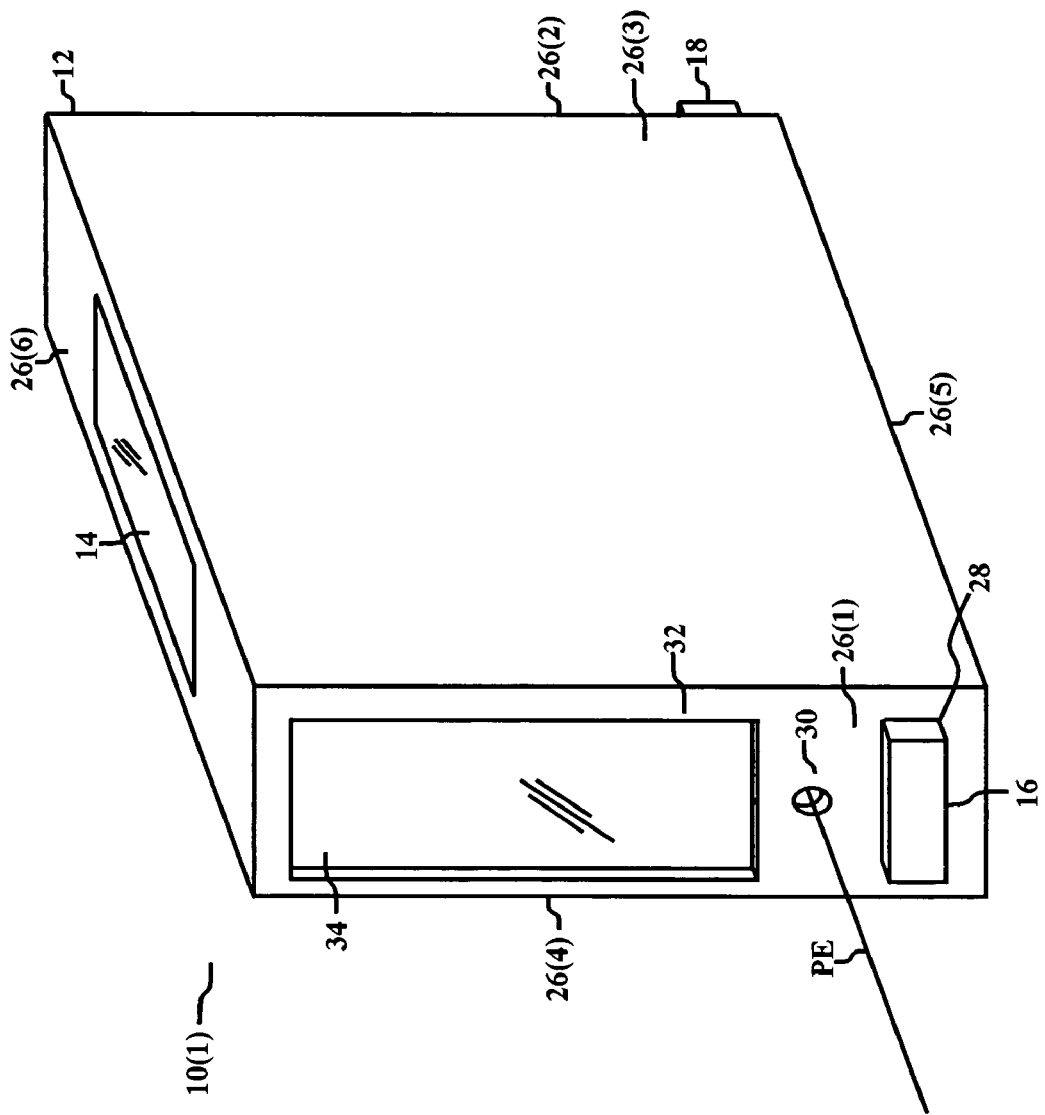
FIG. 1 is a front perspective view of a distance measuring system in accordance with embodiments of the present invention.
Figure 2:
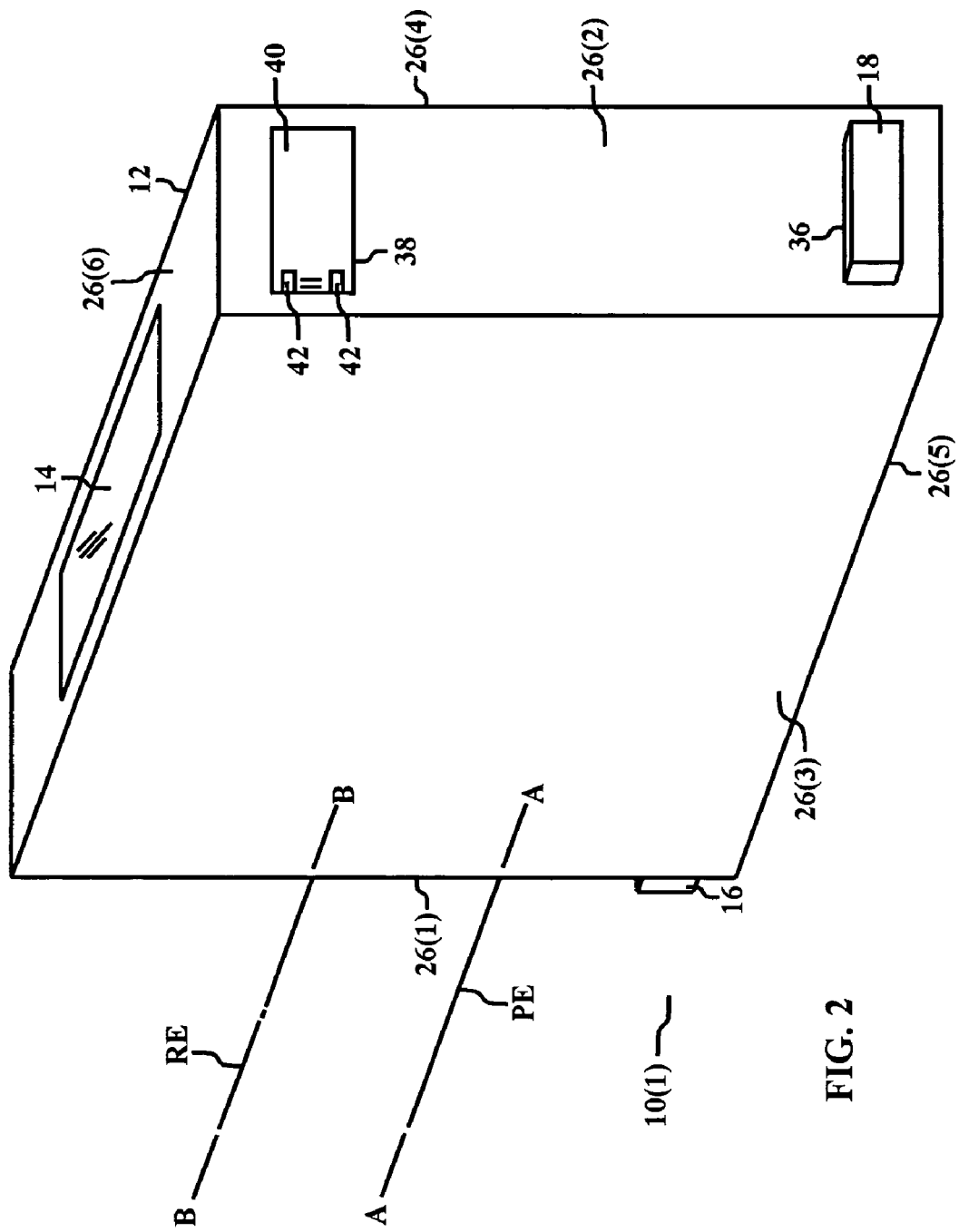
FIG. 2 is a rear perspective view of the distance measuring system shown in FIG. 1.
Figure 3:
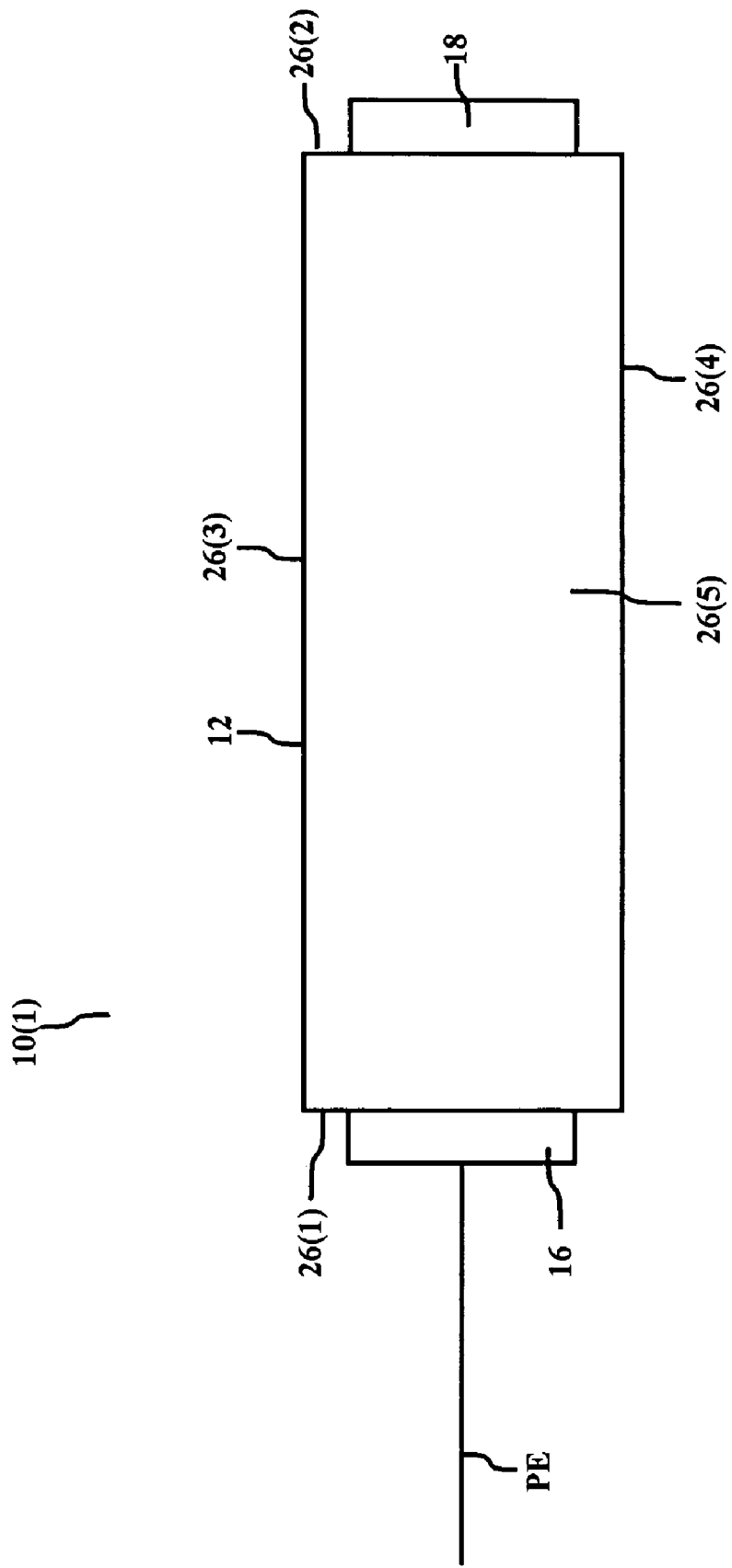
FIG. 3 is a bottom view of the distance measuring system shown in FIG. 1.

A distance measuring system 10(1) in accordance with embodiments of the present invention is illustrated in FIGS. 1–4. The distance measuring system 10(1) includes a housing 12, an alphanumerical display device 14, activation switches 16 and 18, a projected energy generating device 20, an energy receiving device 22, and a distance computation system 24, although the system 10(1) may comprise other types, numbers, and combinations of components. The present invention provides a projected energy type, distance measuring system 10(1) that automatically selects the correct reference plane and powers on the unit as part of the distance measuring operation.

Referring more specifically to FIGS. 1–4, the housing 12 has six surfaces 26(1)–26(6) which are connected together to form a parallelepiped, although the housing 12 could have other numbers of surfaces and other shapes and configurations. Surface 26(5) is substantially perpendicular to both surfaces 26(1) and 26(2) which are used as reference planes for the distance measuring system 10(1), although other surfaces of the device could be used as the reference planes. The surfaces 26(1) and 26(2) are separated about one to twelve inches apart, although their spacing and orientation can vary. Surface 26(6) is also substantially perpendicular to surfaces 26(1)–26(4).

A liquid crystal alphanumerical display device 14 is located along one surface 26(6), although other types of display devices, such as an OLED, in other locations can be used. The liquid crystal alphanumerical display device 14 displays data, such as a measurement, to an operator of the system 10(1). The distance computation system 24 transmits the measured distance to the display device 14 for display.

A rectangular shaped aperture 28, a circular shaped aperture 30, and a recessed rectangular shaped aperture 32 are formed in the surface 26(1), although each of the apertures 28, 30, and 32 could have other shapes and configurations. A section of glass 34 is secured to the housing 12 across the recessed rectangular aperture 32, although other types of transmissive materials could be used to seal the aperture 32 or the aperture 32 could be left open. The activation switch 16 is secured to the housing 12 and has a button which extends out through the aperture 28, although the activation switch 16 could be connected to the housing 12 in other manners. The activation switch 16 is coupled to the projected energy generating device 20 and to the distance computation system 24, although the switch 16 can be coupled to other components and in other arrangements.

A rectangular shaped aperture 36 and a rectangular shaped aperture 38 are formed in the surface 26(2), although each of the apertures 36 and 38 could have other shapes and configurations. A door 40 is seated in the aperture 38 and is pivotally connected by hinges 42 to the housing 12 for movement between a position sealing the aperture 38 and to a position providing access through the aperture 38 to a battery compartment 44 in the housing 12. The activation switch 18 is secured to the housing 12 and has a button which extends out through the aperture 36, although the activation switch 18 could be connected to the housing 12 in other manners. The activation switch 18 is coupled to the projected energy generating device 20 and to the distance computation system 24, although the switch can be coupled to other components in other manners.

A battery 46 is located in the battery compartment 44 and is coupled to the projected energy generating device 20, the energy receiving device 22, and the distance computation system 24, although other types of power sources could be used. The battery 46 provides power to the projected energy generating device 20, the energy receiving device 22, and the distance computation system 24, although the battery 46 can be coupled to other components and in other arrangements.

Figure 4:
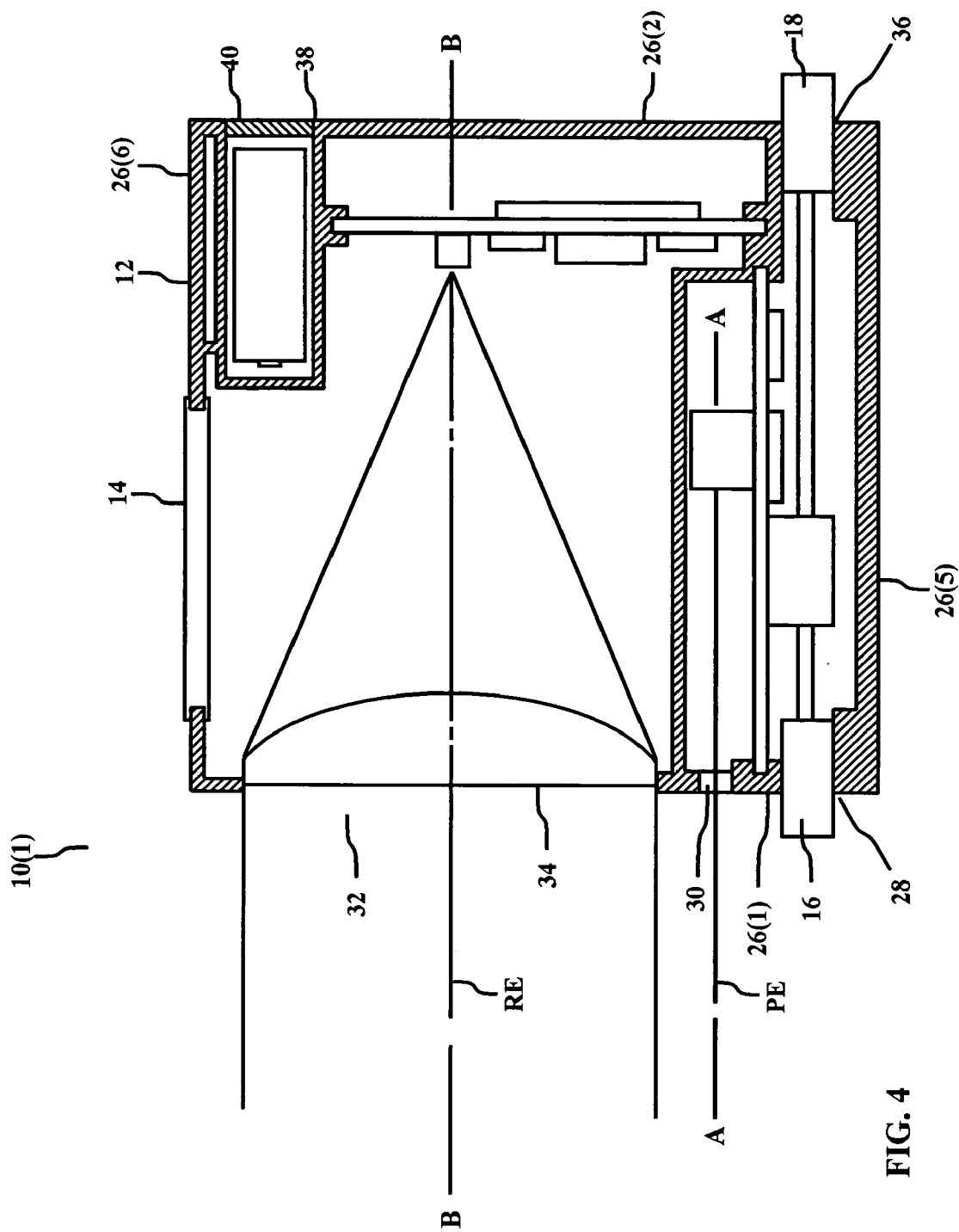
FIG. 4 is a side, cross-sectional view of the distance measuring system shown in FIG. 1.

Referring to FIG. 4, the projected energy generating device 20 is coupled to the distance computation system 24, activation switches 16 and 18, and the battery 46, although the projected energy generating device 20 could be coupled to other components and in other arrangements. The projected energy generating device 20 generates energy, such as laser light or electromagnetic energy, or acoustical energy, and is positioned in the housing to project the generated energy PE through the aperture 30 and substantially along an axis A—A, although other arrangements for projecting the energy PE could be used. The axis A—A of the projected energy PE is substantially orthogonal to surfaces 26(1) and 26(2) which act as the reference planes, although this orientation can vary. The projected energy generating device 20 also provides data about the projected energy PE being transmitted and the timing of transmissions of projected energy PE to the distance computation system 24. The operation of the projected energy generating device 20 to generate and transmit the projected energy PE along the axis A—A is controlled by the distance computation system 24, although the operation of the projected energy generating system 20 can be controlled in other manners, such as in response to the activation of one of the switches 16 and 18.

Referring to FIGS. 1 and 4, the energy receiving device 22 is coupled to the distance computation system 24, activation switches 16 and 18, and the battery 46, although the energy receiving device 22 could be coupled to other components and in other arrangements. The energy receiving device 22 is positioned in the housing 12 to receive reflected energy RE through recessed aperture 32 which has been reflected back from a target substantially along an axis B—B, although other arrangements for receiving the energy could be used. The energy receiving device 22 also provides data to the distance computation system 24 about the received reflected energy RE and the time when the reflected energy RE is received. The operation of the energy receiving device 22 is controlled by the distance computation system 24, although the operation of the energy receiving device 22 can be controlled in other manners. Although a separate projected energy device 20 and a separate energy receiving device 22 are shown, other configurations can be used, such as a transceiver system that transmits and receives the energy.

Referring to FIG. 4, the distance computation system 24 is coupled to the projected energy generating device 20, the energy receiving device 22, the activation switches 16 and 18, the alphanumerical display device 14, and the battery 46 in the housing 12, although the distance computation system 24 could be coupled in other manners to other components. The distance computation system 24 controls the operation of and receives data from the projected energy generating device 20 and the energy receiving device 22 about the projected energy PE and reflected energy RE. The distance computation system 24 also receives data from activation switches 16 and 18 which indicate when one of the switches 16 and 18 is on. The distance computation system includes a processor and memory with programmed instructions for measuring distance as described herein, although the distance computation system 24 can have other types, numbers, and combinations of components coupled in other arrangements and can have other programmed instructions. In these particular embodiments, the programmed instructions include instructions for determining whether the reference plane associated with surface 26(1) or the reference plane associated with surface 26(2) is being used based on which of the activation switches 16 or 18 has been engaged. The programmed instructions also include instructions for determining the distance between the origination object and the target based on the time it takes the projected energy PE to return from being reflected off of the target taking into account the particular reference plane being used.

Referring now to FIGS. 5–8, a distance measuring system 10(2) in accordance with other embodiments of the present invention is illustrated. Distance measuring system 10(2) is identical to distance measuring system 10(1) in structure and operation, except as set forth herein. Elements in distance measuring system 10(2) which are identical to elements in distance measuring system 10(1) will have like reference numerals and will not be described again.

A hook-tab activation switch 50 is slidably mounted on the surface of housing 12, although the hook-tab activation switch 50 could be mounted in other locations. The hook-tab activation switch 50 can be used to activate the distance computation system 24 to initiate a measurement procedure, to indicate to the distance computation system 24 that the reference plane on surface 26(2) has been selected, and to indicate that a distance substantially equal to the distance between the surfaces 26(1) and 26(2) with the reference planes must be added to the distance computation, although the activation switch 50 can be used for other purposes. With the hook-tab activation switch 50, the distance measuring system 10(2) is useful for measuring geometries in which the measuring surface of an origination object OB is not readily accessible to the activation switch 16 or the activation switch 18.

The height and width of the hook-tab activation switch 50 is smaller then the height and width of surface 26(3) of the housing 12, although the height and width of the hook-tab activation switch 50 could be much smaller for compactness or could be made larger than surface 26(3) for more difficult measuring geometries. The hook-tab activation switch 50 is also sized and positioned so that the hook-tab activation switch 50 will not interfere with the operation of the activation switch 16 or the activation switch 18, nor will it interfere with accessibility to the reference plane on surface 26(1) or the reference plane on surface 26(2). Similarly, activation switch 16 and activation switch 18 will not interfere with the operation of the hook-tab activation switch 50 while it is being used for a measurement.

Figure 5:
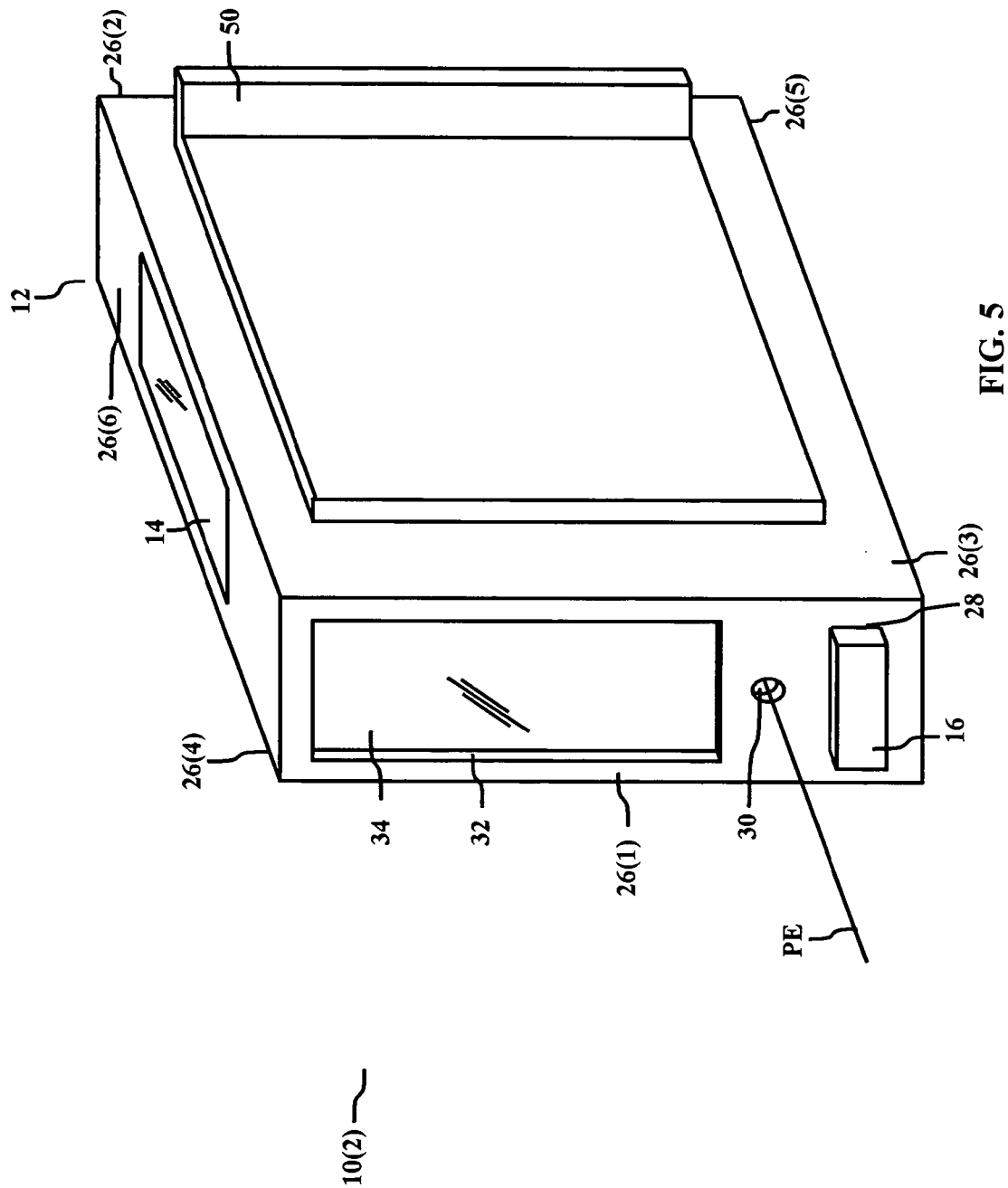
FIG. 5 is a front perspective view of the distance measuring system in accordance with other embodiments of the present invention.
Figure 6:
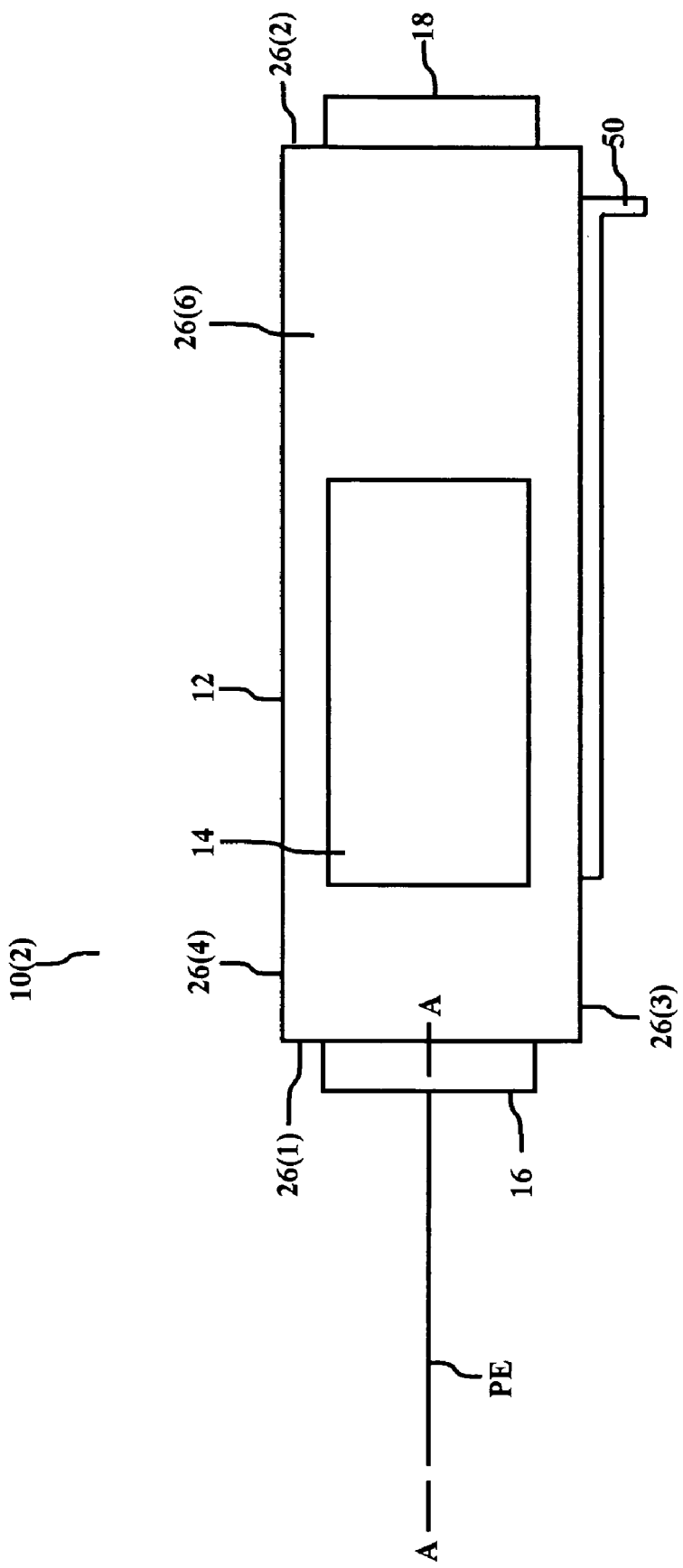
FIG. 6 is a top view of the of the distance measuring system shown in FIG. 5 with a hook-tab activation switch in an inactivated position.
Figure 7:
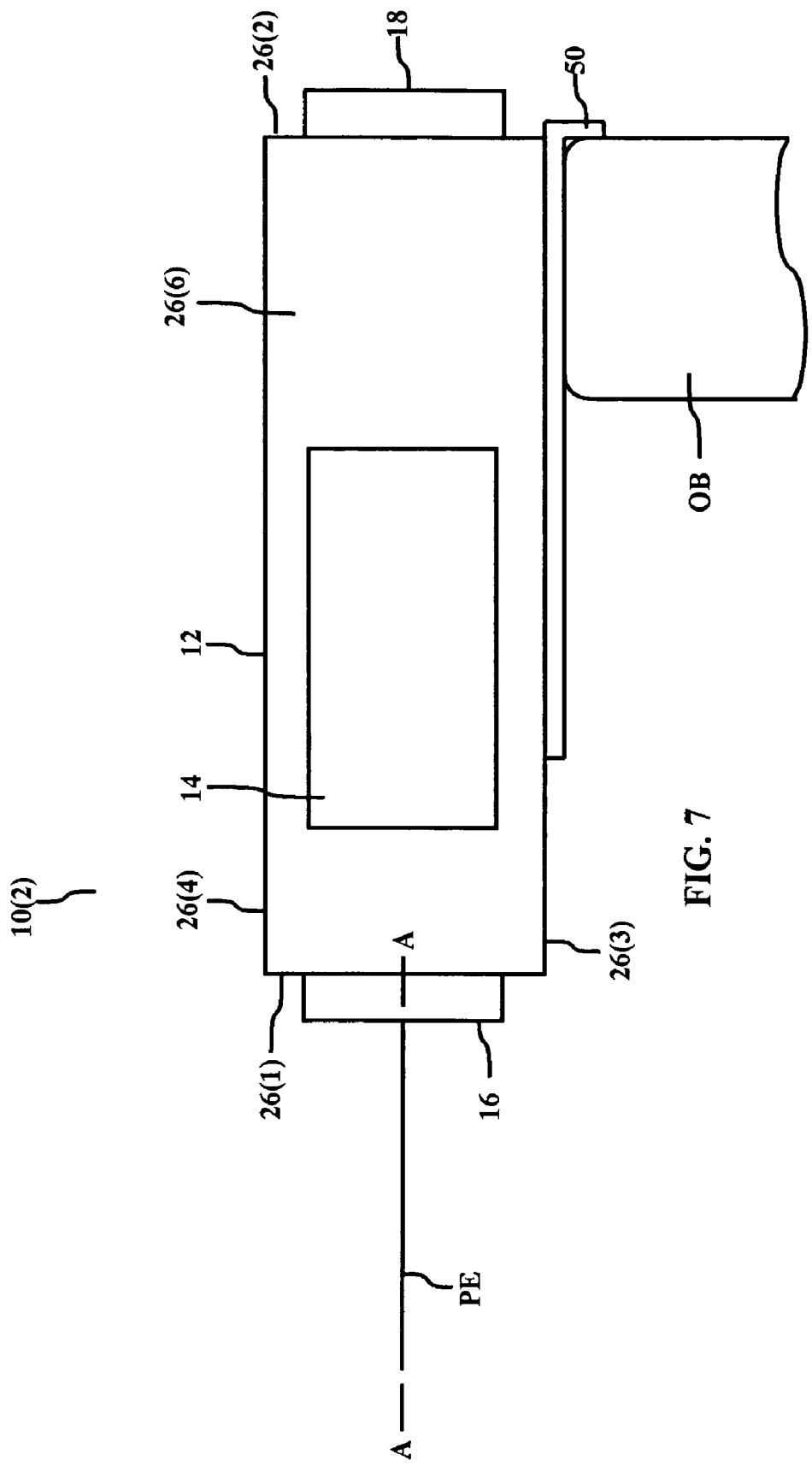
FIG. 7 is a top view of the of the distance measuring system shown in FIG. 5 with a hook-tab activation switch in an activated position.
Figure 8:
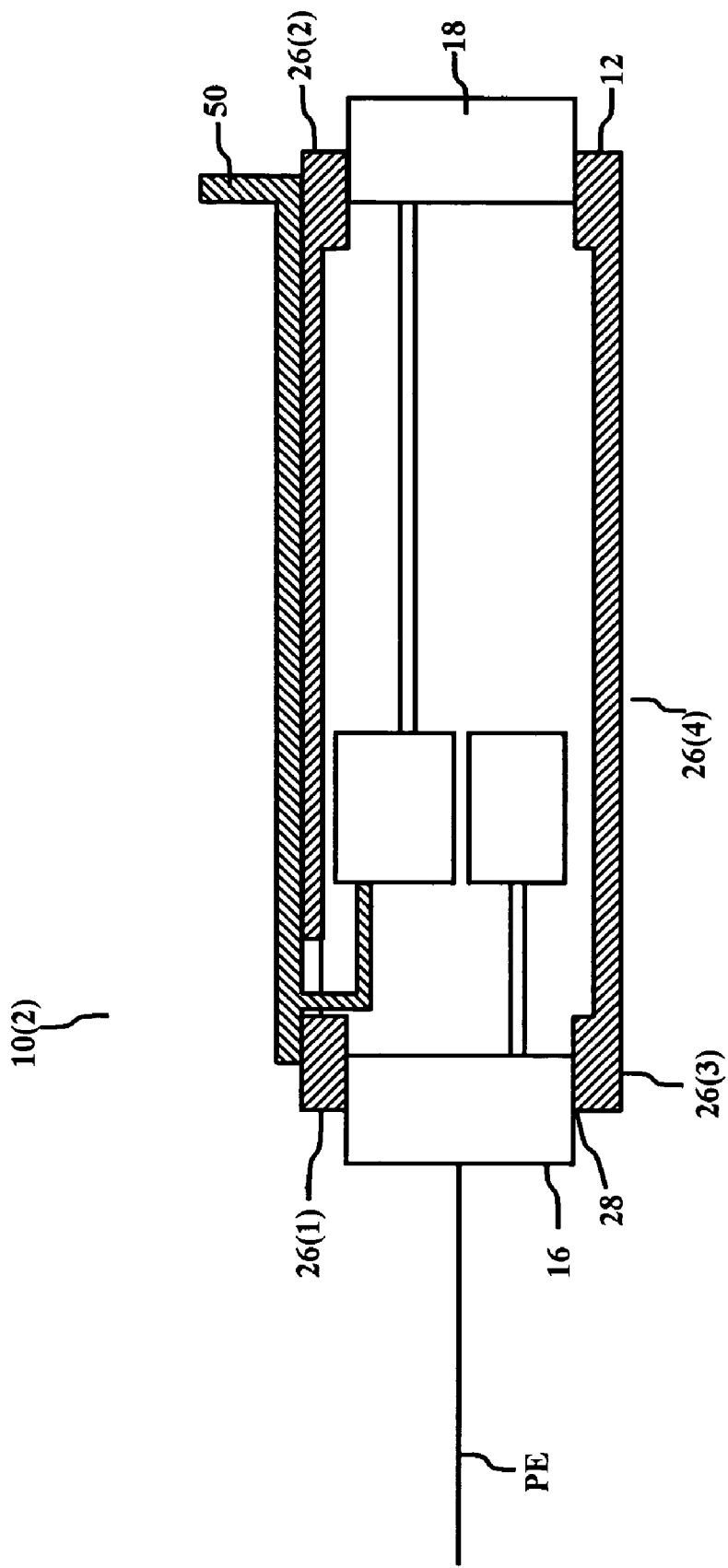
FIG. 8 is a bottom, cross-sectional view of the distance measuring system shown in FIG. 6.

The hook-tab activation switch 50 is shown in the inactivated position in FIGS. 5, 6, and is shown in the activated position in FIG. 7. In the activated position, the hook-tab activation switch 50 is placed about a corner of the origination object OB, and the user slides the housing 12 forward approximately ¼" to initiate the measurement. In the activated position, the plane of measurement of the origination object OB is coincident with the surface 26(2) which acts as the reference plane.

The operation of the distance measuring system 10(1) will now be described with reference to FIGS. 1–4. To perform a measurement, the surface of the distance measuring system 10(1) is placed against a surface of an origination object OB from which the distance to the target will be measured. The origination object OB must be positioned not to obscure apertures 30 and 32. When the surface 26(1) is brought into coincidence with the origination object OB, button of activation switch 16 is depressed.

Depressing the button of activation switch 16 signals the projected energy generating device 20 to emit projected energy PE substantially along the axis A—A through aperture 30. Depressing the button of the activation switch 16 also signals the distance computation system 24 to select the reference plane on the surface 26(1) as the zero or reference plane, coinciding with the plane of the origination object OB. The projected energy generating device 20 transmits data to the distance computation system 24 about the type of energy being projected and when the energy was projected.

The projected energy PE is reflected off of the target and is sent back as reflected energy RE to the energy receiving device 22 substantially along axis B—B. The energy receiving device 22 receives the projected energy reflected back from the target through aperture 32 and sends data to the distance computation system 24 about the received reflected energy RE and the time when the reflected energy RE was received.

The distance computation system 24 determines the distance time based on the data received from the projected energy generating device 20 and from the energy receiving device 22 and about which surface 26(1) or 26(2) of the distance measuring system 10(1) is used as the reference plane. Since the surface 26(1) was placed at the desired starting origination plane for the measurement, the distance computation device 24 does not need to add any distance to the measurement. The process of determining distance based on the time it takes projected energy PE to be reflected back from a target is well known to those of ordinary skill in the art and thus will not be described in detail here. After the distance is computed by the distance computation system 24, the distance is transmitted to and is displayed on the liquid crystal alphanumeric display 14.

To perform another measurement, the surface 26(2) of the distance measuring system 10(1) can be placed against another surface of an origination object from which the distance to the target is to be measured. When the surface 26(2) is brought into contact with the surface of the origination object, the button of the activation switch 18 is depressed.

Depressing the button of activation switch 18 signals the projected energy generating device 20 to emit projected energy substantially along the axis A—A through aperture 30. Depressing the button of the activation switch 18 also signals the distance computation system 24 to select the reference plane on the surface 26(2) as the zero or reference plane, coinciding with the plane of the origination object. The projected energy generating device 20 transmits data to the distance computation system 24 about the type of energy being projected and when the energy was projected.

The projected energy PE is reflected off of the target and is sent back as reflected energy RE to the energy receiving device 22 substantially along axis B—B. The energy receiving device 22 receives the reflected energy RE and sends data to the distance computation system about the received reflected energy RE and the time when the reflected energy RE was received.

The distance computation system 24 determines the distance based on the data received from the projected energy generating device 20 and from the energy receiving device 22 and about which surface of the distance measuring system 10(1) is used as the reference plane. Since the surface 26(2) was placed at the desired origination plane for the measurement, the distance computation system 24 adds in a distance substantially equal to the distance from surface 26(2) to the surface 26(1). Again, the process of determining distance based on the time it takes projected energy PE to be reflected back from a target is well known to those of ordinary skill in the art and thus will not be described in detail here. After the distance is computed by the distance computation system 24, the distance is transmitted to and is displayed on the liquid crystal alphanumeric display device 14.

The operation of the distance measuring system 10(2) shown in FIGS. 5–8 is the same as the operation of the distance measuring system 10(1) shown in FIGS. 1–4, except as described herein. Accordingly, the process of taking a measurement using activation switch 16 or activation switch 18 in the distance measuring system 10(2) is the same as the operation of taking a measurement with the distance measuring system 10(1) described above.

To perform a measurement using the hook-tab activation switch 50, the corner of the hook-tab activation switch 50 is placed firmly over the desired corner of the origination object OB such that the hook-tab activation switch 50 will not slip off the origination object OB during a distance measurement operation. Next, the housing 12 of the distance measuring system 10(2) is slid towards the target whose distance is to be measured. During the sliding operation the hook-tab activation switch 50 will remain stationary and hooked on the corner of the origination object OB. When the housing 12 is slid towards the target, the hook-tab activation switch 50 signals the projected energy generating device 20, the energy receiving device 22, and the distance computation system 24 that the system 10(2) is activated or turned on and sends a signal to the distance computation system 24 about the surface 26(2) which is being used as the reference plane. When the housing 12 is slid in this manner, a stop (not shown) is encountered which prevents the hook-tab activation switch 50 from being extended further. When this stop is reached, the surface of the origination object OB is in the same plane as the surface 26(2) of the housing 12.

As describe above, sliding the hook-tab activation switch 50 activates the system 10(2) and causes the projected energy generating device 20 to emit projected energy PE along axis A—A through aperture 30 and signals the distance computation system 24 to select surface 26(2) as the zero or reference plane, coinciding with the plane of the origination object OB.

The projected energy PE is reflected off of the target and is sent back as reflected energy RE to the energy receiving device 22 substantially along axis B—B. The energy receiving device 22 receives the reflected energy RE from the target through aperture 32 and sends data to the distance computation system 24 about the received reflected energy RE and the time when the reflected energy RE was received, although other information about the energy could be sent.

The distance computation system 24 determines the distance based on the data received from the projected energy generating device 20 and from the energy receiving device 22 and about the surface 26(2) of the distance measuring system which is being used as the reference plane. More specifically, the distance computation system 24 receives data on a propagation time of the received portion of the energy from a start time when the projected energy generating device 20 transmits the energy to a received time when the energy receiving device 22 receives the portion of the energy which is reflected back and uses this information with the identification of the surface used as the reference plane to determine distance. Since the surface 26(2) coincides with the desired plane of the origination object OB for the measurement, the distance computation system 24 adds in a distance substantially equal to the distance from the surface 26(1) to the surface 26(2). Again, the process of determining distance based on the time it takes projected energy PE to be reflected back from a target is well known to those of ordinary skill in the art and thus will not be described in detail here. After the distance is computed by the distance computation system 24, the distance is transmitted to and displayed on the liquid crystal alphanumeric display device 14.

Accordingly, as the above-described operations illustrate, the present invention provides distance measuring systems that are accurate and simple to use. The distance measuring systems 10(1) and 10(2) can be used to measure a distance with one hand without the need for the input of any other additional information.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A distance measuring system comprising:
   a housing with at least one surface;
   at least one switch along the one surface of the housing, the switch having an inactivated position and an activated position when pressed against an origination object, the activated position of the switch identifies the surface as a reference plane with respect to the origination object, wherein in the activated position the surface along which the switch is located and which is identified as the reference plane rests against the origination object;
   an energy system in the housing, the energy system transmits energy towards a target when the switch is in an activated position and receives at least a portion of the energy which is reflected back from the target; and
   a distance computation system coupled to the energy system, the distance computation system uses the received portion of the energy which is reflected back and identification of the surface as the reference plane to determine a distance from the origination object to the target.

2. The system as set forth in claim 1 wherein the energy system further comprises:
   a projected energy device that transmits the energy; and
   an energy receiving device that receive a reflected portion of the energy.

3. The system as set forth in claim 1 where the energy is at least one of electromagnetic and acoustic.

4. The system as set forth in claim 1 wherein the distance computation system uses a propagation time of the received portion of the energy from a start time when the energy system transmits the energy to a received time when the energy system receives the portion of the energy which is reflected back from the target and the identification of the surface as the reference plane to determine the distance from the origination object to the target.

5. The system as set forth in claim 1 wherein the surface which is identified as the reference plane is substantially orthogonal to the direction of measurement.

6. A distance measuring system comprising:
   a housing with at least one surface;
   at least one switch along the one surface of the housing, the switch having an inactivated position and an activated position when pressed against an origination object, the activated position of the switch identifies the surface as a reference plane with respect to the origination object;
   an energy system in the housing, the energy system transmits energy towards a target when the switch is in an activated position and receives at least a portion of the energy which is reflected back from the target;
   a distance computation system coupled to the energy system, the distance computation system uses the received portion of the energy which is reflected back and the identification of the surface as the reference plane to determine a distance from the origination object to the target; and
   a second switch on the housing, the second switch having an inactivated position and an activated position, the activated position of the second switch identifies the second surface as a reference plane with respect to the origination object;

the energy system transmits energy towards a target when the second switch is in an activated position and receives at least a portion of the energy which is reflected back from the target;

the distance computation system uses the received portion of the energy which is reflected back and the identification of the second surface as the reference plane to determine a distance from the origination object to the target.

7. The system as set forth in claim 6 wherein
the first switch comprises a button which extends out from the first surface in the inactivated position and which is substantially flush with the first surface in the activated position when pressed against the origination object; and
wherein the second switch comprises a button which extends out from a second surface of the housing in the inactivated position and which is substantially flush with the second surface when the button is in an activated position.

8. The system as set forth in claim 6 wherein:
the first switch comprises a button which extends out from the first surface in the inactivated position and which is substantially flush with the first surface in the activated position when pressed against the origination object; and
wherein the second switch comprises an L-shaped structure which is slidably mounted on a third surface of the housing for movement between the inactivated position and the activated position where an inner surface of the L-shaped structure is in substantially the same plane as the second surface.

9. The system as set forth in claim 6 further comprising:
a third switch along a third surface of the housing, the third switch having an inactivated position and an activated position when the third switch is moved relative to the housing, the activated position of the third switch identifies the second surface as a reference plane with respect to the origination object;
the energy system transmits energy towards a target when the third switch is in an activated position and receives at least a portion of the energy which is reflected back from the target;
the distance computation system uses the received portion of the energy which is reflected back and the identification of the second surface as the reference plane to determine a distance from the origination object to the target.

10. The system as set forth in claim 9 wherein:
the first switch comprises a button which extends out from the first surface in the inactivated position and which is substantially flush with the first surface in the activated position when pressed against the origination object;
the second switch comprises a button which extends out from a second surface of the housing in the inactivated position and which is substantially flush with the second surface when the button is in an activated position; and
the third switch comprises an L-shaped structure which is slidably mounted on the third surface of the housing for movement between the inactivated position and the activated position where an inner surface of the L-shaped structure is in substantially the same plane as the second surface.

11. The system as set forth in claim 6 wherein the energy system further comprises:
a projected energy device that transmits the energy; and
an energy receiving device that receive a reflected portion of the energy.

12. The system as set forth in claim 6 where the energy is at least one of electromagnetic and acoustic.

13. The system as set forth in claim 6 wherein the distance computation system uses a propagation time of the received portion of the energy from a start time when the energy system transmits the energy to a received time when the energy system receives the portion of the energy which is reflected back from the target and the identification of the surface as the reference plane to determine the distance from the origination object to the target.

14. A method for making a distance measuring system, the method comprising:
providing a housing with at least one surface;
providing at least one switch along the one surface of the housing, the switch having an inactivated position and an activated position when pressed against an origination object, the activated position of the switch identifies the surface as a reference plane with respect to the origination object, wherein in the activated position the surface along which the switch is located and which is identified as the reference plane rests against the origination object;
placing an energy system in the housing, the energy system transmits energy towards a target when the switch is in an activated position and receives at least a portion of the energy which is reflected back from the target; and
coupling a distance computation system to the energy system, the distance computation system uses the received portion of the energy which is reflected back and the identification of the surface as the reference plane to determine a distance from the origination object to the target.

15. The method as set forth in claim 14 wherein the placing the energy system further comprises placing an energy system comprising:
a projected energy device that transmits the energy; and
an energy receiving device that receive a reflected portion of the energy.

16. The method as set forth in claim 14 where the energy is at least one of electromagnetic and acoustic.

17. The system as set forth in claim 14 wherein the coupling the distance computation system further comprises a distance computation system that uses a propagation time of the received portion of the energy from a start time when the energy system transmits the energy to a received time when the energy system receives the portion of the energy which is reflected back from the target and the identification of the surface as the reference plane to determine the distance from the origination object to the target.

18. The method as set forth in claim 14 wherein the surface which is identified as the reference plane is substantially orthogonal to the direction of measurement.

19. A method for making a distance measuring system, the method comprising:
providing a housing with at least one surface;
providing at least one switch along the one surface of the housing, the switch having an inactivated position and an activated position when pressed against an origination object, the activated position of the switch identifies the surface as a reference plane with respect to the origination object;
placing an energy system in the housing, the energy system transmits energy towards a target when the switch is in an activated position and receives at least a portion of the energy which is reflected back from the target;

coupling a distance computation system to the energy system, the distance computation system uses the received portion of the energy which is reflected back and the identification of the surface as the reference plane to determine a distance from the origination object to the target; and putting a second switch on the housing, the second switch having an inactivated position and an activated position, the activated position of the second switch identifies the second surface as a reference plane with respect to the origination object;

the energy system transmits energy towards a target when the second switch is in an activated position and receives at least a portion of the energy which is reflected back from the target;

the distance computation system uses the received portion of the energy which is reflected back and the identification of the second surface as the reference plane to determine a distance from the origination object to the target.

20. The method as set forth in claim 19 wherein:

the first switch comprises a button which extends out from the first surface in the inactivated position and which is substantially flush with the first surface in the activated position when pressed against the origination object; and wherein the second switch comprises a button which extends out from a second surface of the housing in the inactivated position and which is substantially flush with the second surface when the button is in an activated position.

21. The method as set forth in claim 19 wherein:

the first switch comprises a button which extends out from the first surface in the inactivated position and which is substantially flush with the first surface in the activated position when pressed against the origination object; and wherein the second switch comprises an L-shaped structure which is slidably mounted on a third surface of the housing for movement between the inactivated position and the activated position where an inner surface of the L-shaped structure is in substantially the same plane as the second surface.

22. The method as set forth in claim 19 further comprising:

putting a third switch along a third surface of the housing, the third switch having an inactivated position and an activated position when the third switch is moved relative to the housing, the activated position of the third switch identifies the second surface as a reference plane with respect to the origination object;

the energy system transmits energy towards a target when the third switch is in an activated position and receives at least a portion of the energy which is reflected back from the target;

the distance computation system uses the received portion of the energy which is reflected back and the identification of the second surface as the reference plane to determine a distance from the origination object to the target.

23. The method as set forth in claim 22 wherein:

the first switch comprises a button which extends out from the first surface in the inactivated position and which is substantially flush with the first surface in the activated position when pressed against the origination object;

the second switch comprises a button which extends out from a second surface of the housing in the inactivated position and which is substantially flush with the second surface when the button is in an activated position; and the third switch comprises an L-shaped structure which is slidably mounted on the third surface of the housing for movement between the inactivated position and the activated position where an inner surface of the L-shaped structure is in substantially the same plane as the second surface.

24. The method as set forth in claim 19 wherein the placing the energy system further comprises placing an energy system comprising:

a projected energy device that transmits the energy; and
an energy receiving device that receive a reflected portion of the energy.

25. The method as set forth in claim 19 where the energy is at least one of electromagnetic and acoustic.

26. The method as set forth in claim 19 wherein the coupling the distance computation system further comprises a distance computation system that uses a propagation time of the received portion of the energy from a start time when the energy system transmits the energy to a received time when the energy system receives the portion of the energy which is reflected back from the target and the identification of the surface as the reference plane to determine the distance from the origination object to the target.

27. A method for measuring a distance from an origination object to a target, the method comprising:

activating a switch in a housing, the activation identifying a surface of the housing as a reference plane with respect to a surface of the origination object, wherein the surface which is identified as the reference plane and rests against the origination object does not extend substantially in a direction of measurement;

transmitting energy towards a target in response to the activating of the switch;

receiving at least a portion of the energy which is reflected back from the target; and using the received portion of the energy which is reflected back and the identification of the surface of the housing as the reference plane to determine a distance from the origination object to the target.

28. The method as set forth in claim 27 where the energy is at least one of electromagnetic and acoustic.

29. The method as set forth in claim 27 wherein the identified surface is spaced from the surface of the origination object and wherein the using further comprises adding a distance from the identified surface of the housing to the surface of the origination object to determine the distance from the origination object to the target.

30. The method as set forth in claim 27 wherein the using the received portion of the energy further comprises using a propagation time of the received portion of the energy from a start time when the energy system transmits the energy to a received time when the energy system receives the portion of the energy which is reflected back from the target and the identification of the surface as the reference plane to determine the distance from the origination object to the target.

31. A method for measuring a distance from an origination object to a target, the method comprising:

activating a switch in a housing, the activation identifying a surface of the housing as a reference plane with respect to a surface of the origination object;

transmitting energy towards a target in response to the activating of the switch;
receiving at least a portion of the energy which is reflected back from the target: and
using the received portion of the energy which is reflected back and the identification of the surface of the housing as the reference plane to determine a distance from the origination object to the target;
wherein the switch comprises a button and wherein the activating a switch comprises pressing the button from the inactivated position where the button extends out from the identified surface of the housing to the activated position where the button is substantially flush with the identified surface of the housing.

32. A method for measuring a distance from an origination object to a target, the method comprising:
activating a switch in a housing, the activation identifying a surface of the housing as a reference plane with respect to a surface of the origination object;
transmitting energy towards a target in response to the activating of the switch;
receiving at least a portion of the energy which is reflected back from the target; and
using the received portion of the energy which is reflected back and the identification of the surface of the housing as the reference plane to determine a distance from the origination object to the target;
wherein the switch comprises an L-shaped structure which is slidably mounted on another surface of the housing and wherein the activating a switch further comprises moving the switch relative to the housing from the inactivated position to the activated position where an inner surface of the L-shaped structure is in substantially the same plane as the identified surface.

33. A distance measuring system comprising:
a housing with at least one surface;
at least one switch along the one surface of the housing, the switch having an inactivated position and an activated position when pressed against an origination object, the activated position of the switch identifies the surface as a reference plane with respect to the origination object, wherein the switch extends out from the identified surface of the housing in an inactivated position and is substantially flush with the identified surface of the housing in an activated position;
an energy system in the housing, the energy system transmits energy towards a target when the switch is in an activated position and receives at least a portion of the energy which is reflected back from the target; and
a distance computation system coupled to the energy system, the distance computation system uses the received portion of the energy which is reflected back and the identification of the surface as the reference plane to determine a distance from the origination object to the target.

34. A distance measuring system comprising:
a housing with at least one surface;
at least one switch along the one surface of the housing, the switch having an inactivated position and an activated position when pressed against an origination object, the activated position of the switch identifies another surface as a reference plane with respect to the origination object, wherein the switch comprises an L-shaped structure which is slidably mounted on the one surface of the housing and wherein the switch is movable relative to the housing from the inactivated position to the activated position where an inner surface of the L-shaped structure is in substantially the same plane as the identified another surface of the housing;
an energy system in the housing, the energy system transmits energy towards a target when the switch is in an activated position and receives at least a portion of the energy which is reflected back from the target; and
a distance computation system coupled to the energy system, the distance computation system uses the received portion of the energy which is reflected back and the identification of the surface as the reference plane to determine a distance from the origination object to the target.

35. A method for making a distance measuring system, the method comprising:
providing a housing with at least one surface;
providing at least one switch along the one surface of the housing, the switch having an inactivated position and an activated position when pressed against an origination object, the activated position of the switch identifies the surface as a reference plane with respect to the origination object, wherein the switch extends out from the identified surface of the housing in an inactivated position and is substantially flush with the identified surface of the housing in an activated position;
placing an energy system in the housing, the energy system transmits energy towards a target when the switch is in an activated position and receives at least a portion of the energy which is reflected back from the target; and
coupling a distance computation system to the energy system, the distance computation system uses the received portion of the energy which is reflected back and the identification of the surface as the reference plane to determine a distance from the origination object to the target.

36. A method for making a distance measuring system, the method comprising:
providing a housing with at least one surface;
providing at least one switch along the one surface of the housing, the switch having an inactivated position and an activated position when pressed against an origination object, the activated position of the switch identifies another surface of the housing as a reference plane with respect to the origination object, wherein the switch comprises an L-shaped structure which is slidably mounted on the one surface of the housing and wherein the switch is movable relative to the housing from the inactivated position to the activated position where an inner surface of the L-shaped structure is in substantially the same plane as the identified another surface of the housing;
placing an energy system in the housing, the energy system transmits energy towards a target when the switch is in an activated position and receives at least a portion of the energy which is reflected back from the target; and
coupling a distance computation system to the energy system, the distance computation system uses the received portion of the energy which is reflected back and the identification of the surface as the reference plane to determine a distance from the origination object to the target.

* * * * *